ABSTRACT OF THE DISCLOSURE

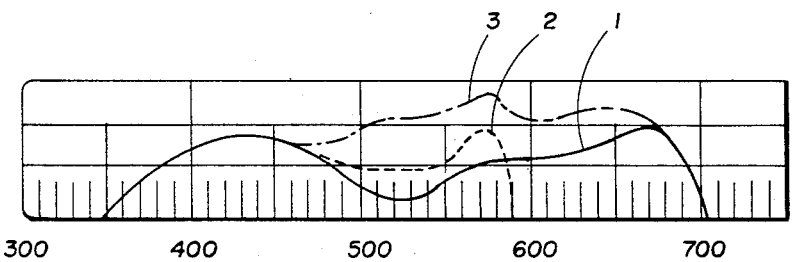
1. DYE C (5-[DI(1-ETHYL-2(1H)-NAPHTHO[1,2-d]THIAZOLYLIDENE)
   ISOPROPYLIDENE]-2,2-DIMETHYL-1,3-DIOXANE-4,6-DIONE).
2. DYE XXV (1,1'-DIETHYL-2,2'-CYANINE IODIDE).
3. DYE C + DYE XXV.
JEAN E. JONES
NORMAN W. KALENDA
INVENTORS 3,411,915
SILVER HALIDE EMULSIONS CONTAINING A SUPERSENSITIZING DYE COMBINATION
Jean E. Jones and Norman W. Kalenda, Rochester, N.Y., assignors to Eastman Kodak Company, Rochester, N.Y., a corporation of New Jersey
Filed July 1, 1965, Ser. No. 468,748
22 Claims. (Cl. 96—104)

Photographic silver halide emulsions containing cyanine dyes together with supersensitizing combinations of certain holopolar carbocyanine dyes containing either a 2,4-chromandione nucleus, a 4,6(1H,5H)pyrimidinedione nucleus, a 1,3-dioxane-4,6-dione nucleus or a 3,5-pyrazolidinedione nucleus.

This invention relates to photographic silver halide emulsions containing simple cyanine, carbocyanine and chain-substituted carbocyanine dyes, and in particular to supersensitizing combinations therewith of certain holopolar carbocyanine dyes.

It is known in the art of making photographic emulsions that certain dyes of the cyanine class alter the sensitivity of photographic emulsions of the gelatino-silver halide kind, when the dyes are incorporated in the emulsions. It is also known that the sensitization produced by a given dye varies somewhat with the type of emulsion in which the dye is incorporated. Furthermore, the sensitization of a given emulsion by a given dye may be altered by varying the conditions in the emulsion. For example, the sensitization may be increased by increasing the silver ion concentration or decreasing the hydrogen ion concentration (i.e., increasing the alkalinity), or both. Thus, sensitization can be increased by bathing plates, coated with a spectrally sensitized emulsion, in water or in aqueous solutions of ammonia. Such a process of altering the sensitivity of a sensitized emulsion by increasing the silver ion concentration and/or by decreasing the hydrogen ion concentration is commonly called "hypersensitization." Hypersensitized emulsions have generally poor keeping qualities.

We have now found a new and advantageous means of altering the sensitivity in emulsions containing simple cyanine, carbocyanine and chain-substituted carbocyanine dyes. Since the conditions in the emulsions, i.e., the hydrogen ion and/or the silver ion concentrations undergo little or no change in our method, we shall designate our new method as a kind of supersensitization.

It is, therefore, an object of our invention to provide photographic silver halide emulsions containing certain simple cyanine, carbocyanine and chain-substituted carbocyanine dyes and in supersensitizing combinations therewith, certain holopolar carbocyanine dyes. Another object is to provide a means for preparing such supersensitized emulsions. Other objects will become apparent from a consideration of the following description and examples.

The simple cyanine, carbocyanine and chain-substituted carbocyanine dyes useful in practicing our invention include those dyes represented by the following general formula:

I. 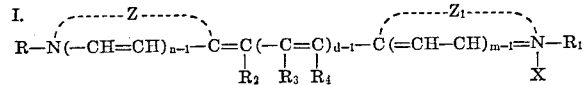

wherein $d$, $n$ and $m$ each represents a positive integer of from 1 to 2, R and $R_1$ each represents an alkyl group of from 1–12 carbon atoms, e.g., methyl, ethyl, propyl, isopropyl, butyl, isobutyl, amyl, decyl, dodecyl, $\beta$-hydroxyethyl, $\gamma$-hydroxypropyl, $\beta$-sulfoethyl, $\gamma$-sulfopropyl, $\omega$-sulfobutyl, carboxymethyl, $\beta$-carboxyethyl, $\gamma$-carboxypropyl, $\beta$-acetoxyethyl, carbomethoxyethyl, $\beta$-carbethoxyethyl, etc.; $R_3$ represents a hydrogen atom, an alkyl group of from 1–4 carbon atoms, e.g., methyl, ethyl, etc., an aryl group, e.g., phenyl, naphthyl, etc., a heterocyclic group, e.g., 2-pyrryl, 3-pyrryl, 2-indolyl, 3-indolyl, 2-thienyl, a 3-pyridyl, a 4-pyridyl, etc., or an anilino group; $R_2$ and $R_4$ each represents a hydrogen atom, or each of R and $R_2$ taken together represent a divalent alkylene group having from 2 to 3 carbon atoms in the chain, e.g., an ethylene or trimethylene group, said group completing a 5- or 6-membered heterocyclic ring, or $R_2$ and $R_4$ taken together represent a divalent aryl group, e.g., an o-phenylene group, said group completing a carbocyclic ring, X represents an acid anion, e.g., chloride, bromide, iodide, thiocyanate, sulfamate, methyl sulfate, ethyl sulfate, perchlorate, p-toluenesulfonate, etc.; and Z and $Z_1$ each represents the non-metallic atoms required to complete a 5- to 6-membered heterocyclic nucleus including such nuclei as a thiazole nucleus (e.g., thiazole, 4-methylthiazole, 4-phenylthiazole, 5-methylthiazole, 5-phenylthiazole, 4,5 - dimethylthiazole, 4,5 - diphenylthiazole, 4-(2-thienyl)thiazole, etc.), a benzothiazole nucleus (e.g., benzothiazole, 4 - chlorobenzothiazole, 5 - chlorobenzothiazole, 6-chlorobenzothiazole, 7-chlorobenzothiazole, 4-methylbenzothiazole, 5-methylbenzothiazole, 6-methylbenzothiazole, 5 - bromobenzothiazole, 6 - bromobenzothiazole, 4-phenylbenzothiazole, 5-phenylbenzothiazole, 4 - methoxybenzothiazole, 5-methoxybenzothiazole, 6-methoxybenzothiazole, 5-iodobenzothiazole, 6-iodobenzothiazole, 4 - ethoxybenzothiazole, 5 - ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc., a thianaphtheno-7',6',4,5-thiazole, etc.), an oxazole nucleus (e.g., 4-methyloxazole, 5-methyloxazole, 4-phenyloxazole, 4,5-diphenyloxazole, 4-ethyloxazole, 4,5-dimethyloxazole, 5-phenyloxazole, etc.), a benzoxazole nucleus (e.g., benzoxazole, 5 - chlorobenzoxazole, 5 - methylbenzoxazole, 5 - phenylbenzoxazole, 6-methylbenzoxazole, 5,6-dimethylbenzoxazole, 4,6-dimethylbenzoxazole, 5-methoxybenzoxazole, 5-ethoxybenzoxazole, 6-chlorobenzoxazole, 6-methoxybenzoxazole, 5-hydroxybenzoxazole, 6-hydroxybenzoxazole, etc.), a naphthoxazole nucleus (e.g., $\alpha$-naphthoxazole, $\beta,\beta$-naphthoxazole, $\beta$-naphthoxazole, etc.), those of the selenazole series (e.g., 4-methylselenazole, 4-phenylselenazole, etc.), a benzoselenazole nucleus (e.g., benzoselenazole, 5-chloroselenazole, 5-methoxybenzoselenazole, 5-hydroxybenzoselenazole, tetrahydrobenzoselenazole, etc.), a naphthoselenazole nucleus (e.g., $\alpha$-naphthoselenazole, $\beta,\beta$-naphthoselenazole, $\beta$-naphthoselenazole, etc.), a thiazoline nucleus (e.g., thiazoline, 4-methylthiazoline, etc.), those of the 2-quinoline series (e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroquinoline, etc.), a 4-quinoline nucleus (e.g., 4-quinoline, 6-methoxy-4-quinoline, 7-methyl-4-quinoline, 8-methyl-4-quinoline, etc.), a 1-isoquinoline nucleus (e.g., 1-isoquinoline, 3,4-dihydro-1-isoquinoline, etc.), a 3-isoquinoline nucleus (e.g., 3-isoquinoline, etc.), a 3,3-nucleus (e.g., 1-isoquinoline, 3,4-dihydro-1-isoquinoline, etc.), a 3-isoquinoline nucleus (e.g., 3-isoquinoline, etc.), a 3,3-dialkylindoline nucleus (e.g., 3,3-dimethylindolenine, 3,3,5-trimethylindolenine, 3,3,7-trimethylindolenine, etc.), a 2-pyridine nucleus (e.g., 2-pyridine, 3-methyl-2-pyridine, 4-methyl-2-pyridine, 5-methyl-2-pyridine, 3,4-dimethyl-2-pyridine, 4-chloro-2- pyridine, 3-hydroxy-2-pyridine, 3-phenyl-2-pyridine, etc.), a 4-pyridine nucleus (e.g., 2-methyl-4-pyridine, 3-methyl-4-pyridine, 3-chloro-4-pyridine, 2,6-dimethyl-4-pyridine, 3-hydroxy-4-pyridine, etc.), a 1-alkylimidazole nucleus (e.g., 1-methylimidazole, 1-ethyl-4-phenylimidazole, 1-butyl-4,5-dimethylimidazole, etc.), a 1-butyl-4-methylbenzimidazole, 1-ethyl-5,6-dichlorobenzimidiazole, etc.), a 1-alkylnaphthimidazole nucleus (e.g., 1-ethyl-α-naphthimidazole, 1-methyl-β-naphthimidazole, etc.), and the like nuclei.

The holopolar carbocyanine dyes useful in practicing our invention include those dyes represented by the following general formula:

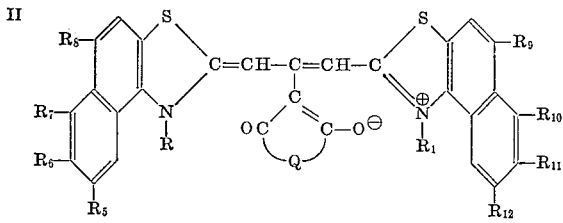

II wherein R and $R_1$ are as previously defined, Q represents the non-metallic atoms required to complete a heterocyclic nucleus such as a 2,4-chromandione nucleus, heterocyclic nucleus such as a 4,6(1H,5H)-pyrimidinedione nucleus, a 1,3-dioxane-4,6-dione nucleus, or a 3,5-pyrazolidinedione nucleus, $R_5$, $R_6$, $R_7$, $R_8$, $R_9$, $R_{10}$, $R_{11}$ and $R_{12}$ each represents a member, such as, hydrogen, a lower alkyl, a lower alkoxy, a halogen, the sulfo, the carboxy, a lower alkoyloxy, a benzoyloxy, alkoxycarbonyl having from 2 to 10 carbon atoms, etc.

According to our invention, we incorporate one or more of the cyanine dyes represented by Formula I above with one or more of the holopolar carbocyanine dyes represented by Formula II above. Our invention is particularly directed to the ordinarily employed gelatino-silver-halide developing-out emulsions. However, our supersensitizing combinations can be employed in silver halide emulsions in which the carrier or vehicle is a hydrophilic colloid other than gelatin, such as, for example, albumin, agar-agar, gum arabic, alginic acid, etc., or a hydrophilic resin such as polyvinyl alcohol, polyvinyl pyrrolidone, a cellulose ether, a partially hydrolyzed cellulose acetate, etc., which has no deleterious effect upon the light-sensitive silver halide. The dyes of Formula I and Formula II can be employed in the combinations of the invention in various concentrations depending upon the particular emulsion, concentration of the silver halide, particular results desired, etc. The optimum concentration of an individual sensitizing dye can be determined in a manner well known to those skilled in the art by measuring the sensitivity of a series of test portions of the same emulsion, each portion containing a different concentration of the sensitizing dye. The optimum concentration of our supersensitizing combinations can, of course, be readily determined in the same manner, by measuring the sensitivity of a series of test portions of the same emulsion, each portion containing different concentrations of the individual dyes in the combination. In determining the optimum concentration for the supersensitizing combination, it is advantageous to employ, at first, concentrations of the individual dyes less than their optimum concentrations. The concentrations of the individual dyes can then be increased until the optimum concentration of the supersensitizing combination is determined.

The methods of incorporating sensitizing dyes in silver halide emulsions are well known to those skilled in the art and these known techniques are employed in dispersing the simple cyanine, carbocyanine and chain-substituted carbocyanine, and holopolar carbocyanine dyes, of our invention in the emulsions. These sensitizing dyes can be directly dispersed in the emulsions, or they can first be dissolved in some convenient solvent, such as pyridine, methyl alcohol, acetone, etc. (or mixtures of such solvents), or diluted with water in some instances, and added to the emulsions in the form of these solutions. If desired, the dyes can be separately dissolved in a given solvent and added separately to the emulsion, or they can be dissolved in the same or different solvent and these solutions mixed together before addition is made to the silver halide emulsions. The cyanine, carbocyanine and chain-substituted carbocyanine, and holopolar carbocyanine dyes can be dispersed in the finished emulsions and should be uniformly distributed throughout the emulsions before the emulsions are coated on a suitable support, such as paper, glass, cellulose ester film polyvinyl resin film (e.g., polystyrene film, polyvinyl chloride film, etc.), polyester film, etc. The following procedure has been found quite satisfactory: Stock solutions of the simple cyanine, carbocyanine and chain-substituted carbocyanine, and holopolar carbocyanine dyes are prepared by separately dissolving these dyes in appropriate solvents as described above. Then, to the flowable silver halide emulsion, the desired amount of stock solution of one of the dyes is slowly added while stirring the emulsion. Stirring is continued until the dye is thoroughly incorporated in the emulsion. Then, the desired amount of stock solution of the other dye is slowly added to the emulsion while stirring. Stirring is continued until the second dye is thoroughly incorporated in the emulsion. The supersensitized emulsions can then be coated on a suitable support and the coating allowed to dry. In some instances, it may be desirable to heat the supersensitized emulsion for a few minutes before coating onto the suitable support. The details of such coating techniques are well known to those skilled in the art. The foregoing procedure and proportions are to be regarded only as illustrative. Clearly, our invention is directed to any silver halide emulsion containing a combination of the aforesaid dyes whereby a supersensitizing effect is obtained.

To different portions of the same batch of photographic gelatino-silver-bromiodide emulsion were added (1) a simple cyanine, carbocyanine or chain-substituted carbocyanine dye, (2) a holopolar carbocyanine dye and (3) a combination of the chain-substituted carbocyanine dye and the holopolar carbocyanine dye. The emulsions were held for a short time at about 50–52° C., coated on a transparent support, chill set and dried. The coatings were then exposed to daylight quality radiation through either a yellow Wratten No. 15 filter which transmits substantially no light of wavelength shorter than about 510 mμ, a yellow Wratten No. 16 Filter which transmits substantially no light of wavelength shorter than about 520 mμ, a red Wratten No. 29 Filter which transmits substantially no light of wavelength shorter than about 610 mμ, or a combination of a Wratten No. 16 Filter and a green Wratten No. 61 Filter which latter transmits only light of wavelength lying between 480 and 600 mμ.

The filter was selected to correspond to the maximum sensitizing region of the particular simple cyanine dye illustrated. The exposed coatings were then processed for three minutes in a developer having the following composition:

| | Grams |
|---|---|
| N-methyl-p-aminophenol sulfate | 2.0 |
| Hydroquinone | 8.0 |
| Sodium sulfite (desiccated) | 90.0 |
| Sodium carbonate (monohydrate) | 52.5 |
| Potassium bromide | 5.0 |

Water to make one liter.

The speed, gamma and fog for each of the coatings was then measured. The same emulsion batch was used for the coatings of each example, although not all of the examples used the same emulsion batch.

Included among the dyes of Formula I above are the following typical dye compounds.

Dye No.            Compounds

I—3,3'-dimethyl-9-phenyl-4,5,4',5'-dibenzothiacarbocyanine bromide
II—3,3'-dimethyl-9-ethyl-4,5,4',5'-dibenzothiacarbocyanine chloride
III—5,5'-dichloro-3,3',9-triethylthiacarbocyanine bromide
IV—3,3',9-triethyl-5,6,5',6'-dibenzothiacarbocyanine p-toluenesulfonate
V—3,3'-dimethyl-9-(2-methyl-3-indolyl)-4,5,4',5'-dibenzothiacarbocyanine p-toluenesulfonate
VI—3,3'-diethyl-9-methyl-4,5,4',5'-dibenzothiacarbocyanine bromide
VII—9-ethyl-3,3'-dimethyl-5'-phenyl-4,5-benzothiacarbocyanine p-toluenesulfonate
VIII—9-ethyl-1',3-dimethylthia-2'-carbocyanine iodide
IX—3,3'-diethyl-9-(2-thienyl)-4,5,4',5'-dibenzothiacarbocyanine p-toluenesulfonate
X—3,3'-dimethyl-9-N-methylanilino-4,5,4',5'-dibenzothiacarbocyanine iodide
XI—3,3',9-trimethyl-4,5,4',5'-dibenzoselenacarbocyanine bromide
XII—3,3'-diethyl-9-methyl-4',5'-benzoselenathiacarbocyanine iodide
XIII—3,3',9-triethyl-4',5'-benzoselenathiacarbocyanine iodide
XIV—3,3'-diethyl-9-methyl-4,5,4'-5'-dibenzoselenathiacarbocyanine iodide
XV—3,3',9-triethyl-5,6,5',6'-dibenzooxacarbocyanine p-toluenesulfonate
XVI—3,3'-dimethyl-9-(4-pyridyl)-4,5,4',5'-dibenzothiacarbocyanine p-toluenesulfonate
XVII—3,3'-dimethyl-9-ethyloxacarbocyanine iodide
XVIII—9-(2,5-dimethyl-1-phenyl-3-pyrryl)-3,3'-dimethyl-4,5,4',5'-dibenzothiacarbocyanine iodide
XIX—3,3'-dimethyl-9-(2-pyrryl)-4,5,4',5'-dibenzothiacarbocyanine p-toluenesulfonate
XX—3,3'-diethyl-9-(3-pyridylmethobromide)-4,5,4',5'-dibenzothiacarbocyanine bromide
XXI—3,3'-diethyl-9(3-pyridylethiodide)-4,5,4',5'-dibenzothiacarbocyanine iodide
XXII—3,3'-dimethyl-5,5',9-triphenylthiacarbocyanine p-toluenesulfonate
XXIII—3,3'-dimethyl-9-phenylthiacarbocyanine iodide
XXIV—3,3'-diethyl-5,5',9-triphenylthiacarbocyanine p-toluenesulfonate
XXV—1,1'-diethyl-2,2'-cyanine iodide
XXVI—1',3-diethylthia-2'-cyanine iodide
XXVII—3,3'-diethyloxacarbocyanine iodide
XXVIII—1,3'-diethyl-3-phenylbenzimidazolooxacarbocyanine perchlorate
XXIX—3,3'-diethyl-4,5,4',5'-dibenzothiacarbocyanine bromide
XXX—3,3'-diethylthiacarbocyanine iodide
XXXI—3,3'-diethyl-9-methyl-8,10-o-phenylenethiacarbocyanine iodide
XXXII—3'-ethyl-9-methyl-3,8-trimethylenethiacarbocyanine bromide
XXXIII—3'-ethyl-3,8-ethylene-9-methylthiacarbocyanine bromide
XXXIV—3,8(1,3-butylene)-3'-ethyl-9-phenyl-4,5;4',5'-dibenzothiacarbocyanine iodide Included among the dyes of Formula II above are the following typical dye compounds.

Dye No.            Compounds

A—3-[di(1-ethyl-2(1H)naphthol[1,2-d]thiazolylidene)isopropylidene]2,4-chromandione
B—2-dimethylamino-5-[di-(1-ethyl-2(1H)-naphtho[1,2-d]-thiazolylidene)isopropylidene]4,6(1H,5H)-pyrimidine-dione
C—5[di(1-ethyl-2(1H)-naphtho[1,2-d]thiazolylidene)-isopropylidene]-2,2-dimethyl-1,3-dioxane-4,6-dione
D—4-[1,3-di(1-ethyl-2-naphtho[1,2-d]thiazolylidene)-isopropylidene]1,2-diphenyl-3,5-pyrazolidine-dione
E—3-[di(1-ethyl-5-methyl-2(1H)naphtho[1,2-d]thiazolylidene)isopropylidene]2,4-chromandione
F—3-[di(1-ethyl-6-ethoxy-2(1H)naphtho[1,2-d]thiazolylidene)isopropylidene]2,4-chromandione
G—3-[di(6-chloro-1-ethyl-2(1H)naptho[1,2-d]thiazolylidene)isopropylidene]2,4-chromandione
H—3-[di(1-ethyl-6-sulfo-2(1H)naphtho[1,2-d]thiazolylidene)isopropylidene]2,4-chromandione
I—3-[di(7-carboxy-1-ethyl-2(1H)naphtho[1,2-d]thiazolylidene)isopropylidene]2,4-chromandione
J—3-[di(6-acetoxy-1-ethyl-2(1H)naphtho[1,2-d]thiazolylidene)isopropylidene]2,4-chromandione
K—3-[di(1-ethyl-6-ethoxycarbonyl-2(1H)naphtho[1,2-d]-thiazolylidene)isopropylidene]2,4-chromandione The following examples will serve to illustrate further the manner of practicing our invention.

*Example 1*

A silver bromoiodide emulsion was made of the type described by Trivelli and Smith, Phot. Journal, vol. 79, 330 (1939). The melted emulsion was divided into separate portions to which were added a solution of the dye sensitizers I, II, III, IV, V, A, and combination of dye A with each of these others as indicated in Table 1. Each portion was digested at 50° C. for 10 minutes, coated on a film support and dried. The dried samples were given identical exposure on an Eastman Sensitometer (Type IB) through a No. 15 Wratten Filter for ⅕ second to a tungsten light source and processed for three minutes in the above-mentioned developer solution, fixed in a conventional sodium thiosulfate fixing bath, washed and dried. Densitometric measurements were then made of the developed images of each coating. The relative speed values were calculated based on an arbitrary relative speed of 100 for the coatings sensitized with 0.08 g. of Dye I, or Dye III, per mole of silver halide, and the gamma values determined. These values along with the fog values are shown in Table 1 below.

TABLE 1

| Dye and Concentration (g./ml. of Silver Halide) | No. 15 Filter | | Fog |
|---|---|---|---|
| | Relative Speed | Gamma | |
| I (0.08) | 100 | 2.76 | 0.06 |
| I (0.08)+A (0.02) | 631 | 2.74 | .06 |
| II (0.08) | 398 | 2.54 | .06 |
| II (0.08)+A (0.02) | 708 | 2.88 | .06 |
| A (0.02) | 1.2 | 3.0 | .06 |
| III (0.08) | 100 | 2.86 | .10 |
| III (0.08)+A (0.02) | 141 | 3.00 | .10 |
| IV (0.08) | 129 | 2.80 | .11 |
| IV (0.08)+A (0.02) | 174 | 3.12 | .10 |
| V (0.08) | 24.5 | 3.38 | .10 |
| V (0.08)+A (0.02) | 54 | 3.14 | .11 |
| V (0.02) | 0.23 | 1.58 | .09 |

The above table shows that the various supersensitizing dye combinations in every case give higher relative speeds than the individual dye components. For example, the combination of Dye I and Dye A produces a relative speed of 631, whereas these two dyes individually produce relative speeds of but 100 and 1.2, respectively.

*Example 2*

Coatings were made as in Example 1, excepting that dye sensitizers VI to XIV, A and combinations of A with these others, and dye sensitizers I, II, VI to XI, XIII, B and combinations of B with these others, were employed. These coatings were exposed on an Eastern Sensitometer through a Wratten No. 29 Filter, processed and densitometric measurements thereof were made. The relative speed (based on 100 for Dye VI), gamma and fog values obtained are listed in the following Table 2.

TABLE 2

| Dye and Concentration (g./ml Silver Halide) | Relative Speed | Gamma | Fog |
|---|---|---|---|
| VI (0.08) | 100 | 2.24 | .08 |
| VI (0.08)+A (0.02) | 240 | 2.10 | .08 |
| VI (0.08)+B (0.02) | 178 | 2.24 | .08 |
| VII (0.08) | 132 | 2.30 | .08 |
| VII (0.08)+ (0.02) | 331 | 2.70 | .08 |
| VII (0.08)+B (0.02) | 269 | 2.52 | .08 |
| VIII (0.08) | 80 | 1.64 | .07 |
| VIII (0.08)+A (0.02) | 257 | 1.69 | .07 |
| VIII (0.08)+B (0.02) | 246 | 1.61 | .07 |
| IX (0.08) | 74 | 2.66 | .08 |
| IX (0.08)+A (0.02) | 417 | 2.90 | .08 |
| IX (0.08)+B (0.02) | 316 | 2.78 | .08 |
| X (0.08) | 105 | 2.64 | .08 |
| X (0.08)+A (0.02) | 269 | 2.60 | .08 |
| X (0.08)+B (0.02) | 182 | 2.56 | .08 |
| XI (0.08) | 53 | 2.60 | .08 |
| XI (0.08)+A (0.02) | 132 | 2.50 | .08 |
| XI (0.08)+B (0.02) | 73 | 2.64 | .08 |
| I (0.08) | 67 | 2.64 | .09 |
| I (0.08)+B (0.02) | 302 | 2.70 | .08 |
| II (0.08) | 251 | 2.54 | .09 |
| II (0.08)+B (0.02) | 331 | 2.60 | .09 |
| XII (0.08) | 44 | 2.12 | .08 |
| XII (0.08)+A (0.02) | 174 | 2.16 | .08 |
| XIII (0.08) | 107 | 1.80 | .08 |
| XIII (0.08)+A (0.02) | 209 | 1.67 | .08 |
| XIII (0.08)+B (0.02) | 219 | 1.50 | .06 |
| XIV (0.08) | 78 | 2.39 | .07 |
| XIV (0.08)+A (0.02) | 209 | 1.96 | .08 |
| A (0.02) | 39 | 1.95 | .08 |
| B (0.02) | 29 | 2.00 | .06 |

The supersensitizing combinations listed in the above table show in every case of comparison substantially higher relative speeds than do the individual dyes.

*Example 3*

Coatings were made as in Example 1 excepting that dye sensitizers XVII, A and combination of Dye XVII with sensitizer A were used. The coatings were exposed on an Eastman Sensitometer through a Wratten No. 16 Filter, processed and the density values determined. The relative speed (based on 100 for Dye XVII), gamma and fog values are set forth in Table 3 below.

TABLE 3

| Dye and Concentration (g./mol Silver Halide) | Relative Speed | Gamma | Fog |
|---|---|---|---|
| XVII (.08) | 100 | 2.82 | .10 |
| XVII (.08)+A (.02) | 457 | 3.20 | .10 |
| A (.02) | 2.2 | 3.28 | .08 |

The improvement in relative speed of the supersensitizing dye combination is approximately 4 times that of the sum of the individual dyes.

*Example 4*

Coatings were made as in Example 1, excepting that dye sensitizers XVI to XXI and A and combinations of A with these others, and dye sensitizers I, II and C and combinations of C with I and II, were employed. The coatings were exposed on an Eastman Sensitometer through Wratten No. 29 or combination of No. 16 and No. 61 Filters, indicated in the tables processed and the density measurements made, with results as indicated in Tables 4, 5, 6 and 7, wherein the relative speeds (based on 100 for Dyes I, XVI, XVII, and XVIII), gammas and fog values are set forth.

TABLE 4

| Dye and Concentration (g./mol Silver Halide) | Exposed through Wratten Filter No. 29 | | |
|---|---|---|---|
| | Relative Speed | Gamma | Fog |
| C (0.02) | 3.6 | 3.10 | .07 |
| I (0.08)+C (0.02) | 513 | 3.20 | .08 |
| I (0.08) | 100 | 3.16 | .08 |
| II (0.08)+C (0.02) | 575 | 3.10 | .08 |
| II (0.08) | 355 | 2.90 | .08 |

TABLE 5

| Dye and Concentration (g./mol Silver Halide) | Exposed through Wratten Filter No. 29 | | |
|---|---|---|---|
| | Relative Speed | Gamma | Fog |
| XVI (0.08) | 100 | 2.76 | .04 |
| XVI (0.08)+A (0.02) | 332 | 3.04 | .05 |
| A (0.02) | 2.4 | 1.43 | .04 |

TABLE 6

| Dye and Concentration (g./mol Silver Halide) | Exposed through Wratten Filters No. 16 and 61 | | |
|---|---|---|---|
| | Relative Speed | Gamma | Fog |
| XVII (0.08) | 100 | 1.98 | .05 |
| XVII (0.08)+A (0.02) | 741 | 2.66 | .05 |
| A (0.02) | (¹) | (¹) | .05 |

¹ No image.

TABLE 7

| Dye and Concentration (g./mol Silver Halide) | Exposed through Wratten Filter No. 29 | | |
|---|---|---|---|
| | Relative Speed | Gamma | Fog |
| XVIII (0.08) | 100 | 2.82 | .06 |
| XVIII (0.08)+A (0.02) | 562 | 3.00 | .06 |
| XXX (0.08) | 339 | 2.78 | .07 |
| XIX (0.08)+A (0.02) | 955 | 2.88 | .05 |
| XX (0.08) | 13.2 | 2.70 | .05 |
| XX (0.08)+A (0.02) | 105 | 2.46 | .07 |
| XXI (0.08) | 95 | 2.60 | .07 |
| XXI (0.08)+A (0.02) | 257 | 2.36 | .07 |
| A (0.02) | 19.5 | 3.66 | .06 |

It will be noted that the supersensitizing dye combinations in above Table 4 to 7, in each case of comparison, give relative speeds substantially greater than do the individual dyes.

*Example 5*

Coatings were made as in Example 1 excepting that dye sensitizers I, IV, XXII, XXIII, XXIV, D and combinations of D with these others, were used. The coatings were exposed on an Eastman Sensitometer through a Wratten No. 29 Filter, processed and the density measurements made. The relative speed (based on 100 for Dyes I and XXII), gamma and fog values are listed in the following Table 8.

TABLE 8

| Dye and Concentration (g./mol Silver Halide) | Relative Speed | Gamma | Fog |
|---|---|---|---|
| I (0.08) | 100 | 2.40 | .07 |
| I (0.08)+D (0.02) | 501 | 2.26 | .08 |
| D (0.02) | 2.1 | 2.64 | .06 |
| IV (0.08) | 324 | 1.95 | .08 |
| IV (0.08)+D (0.02) | 457 | 2.06 | .07 |
| XXII (0.08) | 100 | 2.66 | .08 |
| XXII (0.08)+D (0.02) | 295 | 2.86 | .08 |
| XXIII (0.08) | 45 | 2.34 | .06 |
| XXIII (0.08)+D (0.02) | 289 | 2.70 | .07 |
| XXIV (0.08) | 97 | 3.00 | .08 |
| XXIV (0.08)+D (0.02) | 209 | 3.04 | .08 |
| D (0.02) | 1.95 | 3.08 | .06 |

Markedly improved relative speeds are shown in the above table for the specified supersentizing dye combinations as compared with the speeds of the individual dye components.

*Example 6*

Coatings were made as in Example 1 excepting that dye sensitizers XXV, XXVI, XXVII, XXVIII, XXIX, XXX, A, C and combinations of A and C with these others, were employed. The coatings were exposed on an Eastman Sensitometer through Wratten No. 16, No. 29 and combination of No. 16 and No. 61 Filters, processed and the density values determined, with results as indicated in Tables 9, 10 and 11, wherein the relative speeds (based on 100 for Dyes XXV, XXIX and C), gammas and fog values are listed.

TABLE 9

| Dye and Concentration (g./mol Silver Halide) | Exposed through Wratten Filters No. 61 and No. 16 | | |
|---|---|---|---|
| | Relative speed | Gamma | Fog |
| A (0.02) | 10.2 | 1.16 | .05 |
| C (0.02) | 40 | 1.60 | .05 |
| XXV (0.08) | 100 | 1.60 | .08 |
| XXV (0.08)+A (0.02) | 832 | 1.58 | .08 |
| XXV (0.08)+C (0.02) | 1,020 | 1.45 | .07 |

TABLE 10

| Dye and Concentration (g./mol Silver Halide) | Exposed through Wratten Filter No. 29 | | |
|---|---|---|---|
| | Relative Speed | Gamma | Fog |
| A (0.02) | 6 | 2.0 | .05 |
| C (0.02) | 100 | 1.48 | .05 |
| XXVI (0.08) | (¹) | (¹) | .05 |
| XXVII (0.08) | (²) | (²) | .07 |
| XXVIII (0.08) | (²) | (²) | .07 |
| XXVI (0.08)+A (0.02) | 166 | 1.30 | .08 |
| XXVII (0.08)+A (0.02) | 166 | 1.52 | .04 |
| XXVIII (0.08)+A (0.02) | 110 | 0.96 | .04 |
| XXVI (0.08)+C (0.02) | 246 | 1.48 | .04 |
| XXVII (0.08)+C (0.02) | 240 | 1.10 | .04 |
| XXVIII (0.08)+C (0.02) | 166 | 0.95 | .04 |

¹ Slight image.
² No image.

TABLE 11

| Dye and Concentration (g./mol Silver Halide) | Exposed through Wratten Filter No. 29 | | |
|---|---|---|---|
| | Relative Speed | Gamma | Fog |
| A (0.02) | 5.9 | 2.00 | .05 |
| C (0.02) | 58 | 1.55 | .05 |
| XXIX (0.08) | 100 | 1.50 | .06 |
| XXX (0.08) | 35.5 | 1.40 | .06 |
| XXIX (0.08)+A (0.02) | 145 | 1.32 | .06 |
| XXX (0.08)+A (0.02) | 135 | 1.18 | .05 |
| XXIX (0.08)+C (0.02) | 141 | 1.23 | .05 |
| XXX (0.08)+C (0.02) | 85 | 1.40 | .05 |

Example 7

Coatings were made as in Example 1, excepting that dye sensitizers XXXI, XXXIII, XXXIV, C and combinations of C with each of these others, were used. The coatings were exposed on an Eastman Sensitometer through a Wratten No. 16 Filter, processed as in Example 1 and the relative speeds (based on 100 for Dye XXXI), gamma and fog values determined. These are listed in the following Table 12.

TABLE 12

| Dye and Concentration (g./mol Silver Halide) | Relative Speed | Gamma | Fog |
|---|---|---|---|
| C (0.02) | 398 | 1.60 | 0.04 |
| XXXI (0.08) | 100 | 1.61 | .06 |
| XXXI (0.08)+C (0.02) | 1,260 | 1.54 | .06 |
| XXXII (0.08) | 1,000 | 1.37 | .06 |
| XXXII (0.08)+C (0.02) | 2,570 | 1.55 | .06 |
| XXXIII (0.08) | 1,180 | 1.47 | .06 |
| XXXIII (0.08)+C (0.02) | 2,460 | 1.64 | .06 |
| XXXIV (0.08) | 380 | 1.69 | .06 |
| XXXIV (0.08)+C (0.02) | 1,290 | 1.59 | .06 |

The above Tables 10, 11 and 12 show that the specified supersensitizing dye combinations give substantially higher relative speeds than do the individual dye components. In the case of Table 9, the Dye XXV which is assigned the speed value of 100, on being combined with Dye A and Dye C results in relative speeds of 832 and 1020, respectively.

By reference to above Table 12, it will be seen that the relative speeds of the specified dye combinations are approximately from 1.5 (Dye XXXIII+C) to 2.5 (Dye XXXI+C) times that of the sum of the relative speeds of the individual dyes.

In the accompanying drawing curve 1 represents the sensitivity of an ordinary gelatino-silver-bromoiodide emulsion sensitized with just 5-[di(1-ethyl-2-(1H)-naphtho[1,2 - d]thiazolylidine)isopropylidene] - 2,2-dimethyl-1,3-dioxane-4,6-dione (Dye C), curve 2 represents the sensitivity of the same emulsion sensitized with just 1,1'-diethyl-2,2'-cyanine iodide (Dye XXV), while curve 3 represents the sensitivity of the same emulsion sensitized with both 5-(di[1-ethyl-2(1H)-naphtho[1,2-d]thiazolylidene)isopropylidene] - 2,2 - dimethyl - 1,3 - dioxane-4,6-dione and 1,1'-diethyl-2,2'-cyanine iodide (Dye XXV+ Dye C). Sensitometric measurements for emulsions sensitized in the manner shown in the drawing are given in Example 6, Table 9.

The simple cyanine, carbocyanine and the chain-substituted carbocyanine dyes coming under Formula I above include many well known dyes. Such dyes can advantageously be prepared in accordance with the processes of a number of patents such as Brooker U.S. Patent 1,861,836, issued June 7, 1932; Brooker U.S. Patent 1,934,657, issued Nov. 7, 1933; Brooker U.S. Patent 1,950,876, issued Mar. 13, 1934; White U.S. Patent 1,990,681, issued Feb. 12, 1935; Kostowsky U.S. Patent 2,107,379, issued Feb. 8, 1938; Brooker U.S. Patent 2,112,140, issued Mar. 22, 1938; Brooker U.S. Patent 2,202,827, issued June 4, 1940; Brooker U.S. Patent 2,241,237, issued May 6, 1941; Carroll et al. U.S. Patent 2,369,646, issued Feb. 20, 1945; Carroll et al. U.S. Patent 2,369,657, issued Feb. 20, 1945; Van de Straete U.S. Patent 2,484,536, issued Oct. 11, 1949; Keyes U.S. Patent 2,486,173, issued Oct. 25, 1949; Van Zandt et al. U.S. Patent 2,515,913, issued July 18, 1950; Dent et al. U.S. Patent 2,537,880, issued Jan. 9, 1951; Heseltine et al. U.S. Patent 2,666,761, issued Jan. 19, 1954; Jones U.S. Patent 2,751,298, issued June 19, 1956; etc.

The holopolar carbocyanine dyes coming under Formula II above can be prepared by various methods. For example, the dyes containing the 2,4-chromandione nucleus are prepared by reacting approximately equimolar proportions of a compound of the formula:

III

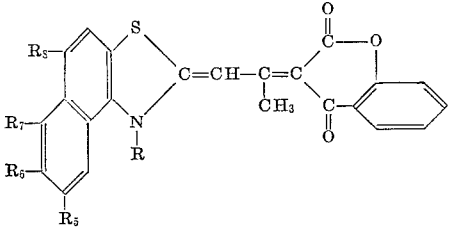

with a compound of the formula:

IV

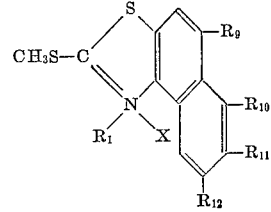

wherein R, $R_1$, $R_5$ through $R_{12}$, and X are as previously defined, in the presence of nitrogen base such as triethylamine, and acetic anhydride. For example, 3-[di(1-ethyl-2(1H)naphtho]1,2 - d]thiazolylidine)isopropylidene]2,4-chromandione (Dye A above) was prepared as follows:

3-[(1 - Ethylnaphtho[1,2 - d]thiazolin - 2-ylidene-2-isopropylidene]-2,4-chromandione (4.13 g., 0.01 moles), 1-ethyl-2-methylthionaphtho[1,2-d]thiazolium p-toluenesulfonate (4.31 g., 0.01 moles), acetic anhydride (20 ml.) and triethylamine (5 ml.) were mixed together and heated with stirring at refluxing temperature for 25 min. and then chilled. The solid dye which formed was removed by filtration and dried. The yield of crude dye was 2.80 g. (45%).

The dye was purified by dissolving it in warm cresol, filtering the solution and diluting the filtrate with 3 volumes of methanol to bring about recrystallization. The yield of dye after two such purifications was 1.00 g. (16%), M.P. 327–328° C. dec.

The intermediate compound of Formula III, 3-[(1-ethyl-naphthol[1,2 - d] - thiazolin-2-ylidene)-2-isopropylidene] 2,4-chromandione was prepared in the following manner:

1 - Ethyl-2-methylnaphtho[1,2-d]thiazolium p-toluenesulfonate (4.0 g., 0.01 moles), 4-hydroxycoumarin (1.62 g., 0.01 moles), pyridine (20 ml.) and triethylorthoacetate (10 ml.) were mixed together and heated at refluxing temperature for one hour. After chilling, the reaction mixture was filtered to remove the solid dye that had precipitated. The dye was washed with a little methanol and dried. The yield of crude dye was 3.0 g. (73%).

The dye was purified by dissolving it in boiling pyridine, filtering the solution, diluting it with two volumes of methanol to recrystallize the dye and chilling it. The yield after two such recrystallizations was 0.9 g. (22%), M.P. 237–238° C. dec.

It will be apparent from the foregoing that any other of the dye compounds of Formula II containing the 2,4-chromandione nucleus can be prepared in similar manner by appropriate selection of intermediates defined by Formulas III and IV above.

For the preparation of the holopolar carbocyanine dyes of Formula II above containing the 4,6-pyrimidinedione nucleus a compound of the formula:

V
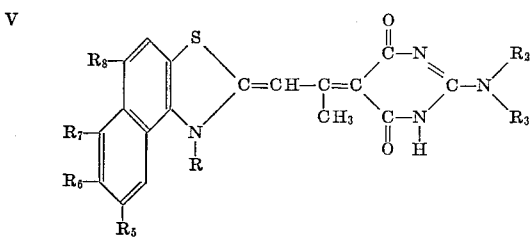

wherein R, $R_5$ through $R_{12}$ are as previously defined, and $R_2$ and $R_3$ each represents a lower alkyl group (e.g., methyl, ethyl, etc.) is reacted with a compound of Formula IV above following the procedure described above for the preparation of the dyes containing the 2,4-chromandione nucleus. Thus, for example, 2-dimethylamino-5 - [di(1 - ethyl - 2(H) - naphtho[1,2 - d] - thiazolylidine) - isopropylidene] - 4,6(1H,5H) - pyrimidinedione, mp. 222–224° C. (Dye B above) was prepared from 2-dimethyl - 5 - [1 - ethyl - 2(1H) - naphtho[1,2 - d]thiazolylidine)isopropylidene - [4,6 - (1H,5H) - pyrimidinedione and 1-ethyl-2-methylthionaphtho[1,2-d]-thiazolium p-toluenesulfonate.

The intermediate of Formula V above was prepared in similar manner to that described above for the preparation of the dyes containing the 2,4-chromandione nucleus, i.e., by reacting 1-ethyl-2-methylnaphtho[1,2-d]thiazolium p-toluenesulfonate with 2-dimethylamino-4,6-pyrimidinediol of the formula:

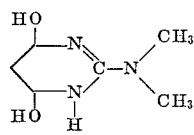

The above diol was prepared in the following manner:
1,1-Dimethylguanidine sulfate (182 g., 1 mol.) was added to a solution of sodium methoxides in methanol (15 g. sodium in 300 ml. methanol). After heating under reflux for thirty minutes, diethyl malonate (106 g., 1 mol.) was added and the mixture refluxed for sixteen hours. After cooling, the mixture was diluted with 450 ml. of water and acidified with acetic acid. The solid was collected by filtration and dried. Yield of product 63.2 g. (61%), mp.>310° C.

By appropriate selection of intermediates defined by Formulas IV and V, it will be apparent that any other of the dye compounds of Formula II containing the 4,6-pyrimidinedione nucleus can be readily prepared by the foregoing procedures.

To prepare the holopolar carbocyanine dyes of Formula II above containing the 1,3-dioxane-4,6-dione nucleus, such as Dye C above, a convenient method comprises reacting a 3-alkyl-2-ethylmercapto benzothiazolium alkyl sulfate with a 5-[3-alkyl-2-benzothiazolinylidene)-isopropylidene] - 2,2 - dialkyl - 1,3 - dioxane - 4,6 - dione, in pyridine, in the presence of a nitrogen base such as triethylamine. Further details of their preparation can be had by reference to copending application of Donald W. Heseltine, Ser. No. 463,024, filed June 10, 1965 wherein such holopolar carbocyanine dyes are described and claimed.

The dyes of Formula II above containing the 3,5-pyrazolidinedione nucleus can be conveniently prepared in accordance with the methods described in copending application of Philip W. Jenkins et al, Ser. No. 286,449, filed June 10, 1963. For example, 4-[1,3-di(1-ethyl-2-naphtho[1,2 - d]thiazolylidene) - isopropylidene]1,2 - diphenyl-3,5-pyrazolidinedione (Dye D above) can be prepared from 3,3'-diethyl-9-ethylthio-4,5-4',5'-dibenzothiacarbocyanine ethyl sulfate and 1,2-diphenyl-3,5-pyrazolidinedione, by heating approximately equimolar proportions, in pyridine, in the presence of a nitrogen base such as triethylamine. Other members coming under Formula II above can be prepared in similar manner by appropriate selection of intermediates.

The invention has been described in detail with particular reference to preferred embodiments thereof but it will be understood that variations and modifications can be effected within the spirit and scope of the invention as described hereinabove and as defined in the appended claims.

We claim:
1. A photographic silver halide emulsion containing a supersensitizing combination of (1) a dye having the general formula:

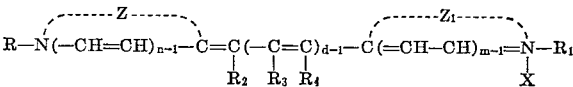

and (2) a holopolar dye having the general formula:

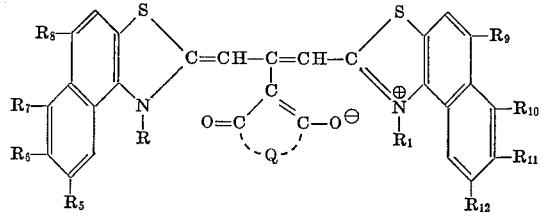

wherein $d$, $m$ and $n$ each represents a positive integer of from 1 to 2, each R and $R_1$ represents an alkyl group having from 1–12 carbon atoms, $R_3$ represents a member selected from the class consisting of the hydrogen atom, an alkyl group of from 1–4 carbon atoms, a phenyl group, a naphthyl group, a pyrryl group, an indolyl group, a thienyl group, a pyridyl group and an anilino group, $R_2$ and $R_4$ each represents the hydrogen atom, each of R and $R_2$ taken together and $R_1$ and $R_4$ taken together represent a divalent alkylene group having from 2 to 3 carbon atoms, $R_2$ and $R_4$ taken together represent an o-phenylene group, $R_5$, $R_6$, $R_7$, $R_8$, $R_9$, $R_{10}$, $R_{11}$ and $R_{12}$ each represents a member selected from the class consisting of hydrogen, a lower alkyl group, a lower alkoxy group, a halogen atom, the sulfo group, the carboxy group, a lower alkoyloxy group, a benzoyloxy group, and an alkoxycarbonyl group having from 2 to 10 carbon atoms, X represents an acid anion, Q represents the nonmetallic atoms required to complete a heterocyclic group selected from the class consisting of a 2,4-chromandione nucleus, a 4,6(1H,5H)-pyrimidinedione nucleus, a 1,3-dioxane-4,6-dione nucleus, and a 3,5-pyrazolidinedione nucleus and Z and $Z_1$ each represents the non-metallic atoms required to complete a heterocyclic nucleus selected from the class consisting of a thiazole nucleus, a benzothiazole nucleus, a naphthothiazole nucleus, a thianaphtheno-7′,6′,4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-quinoline nucleus, a 4-quinoline nucleus, a 1-isoquinoline nucleus, a 3-isoquinoline nucleus, an imidazole nucleus, a benzimidazole nucleus, a naphthimidazole nucleus, a 3,3-dialkylindolenine nucleus, and a pyridine nucleus.

2. A photographic silver halide emulsion of claim 1 containing a supersensitizing combination in which the holopolar dye is 3-[di(1 - ethyl - 2(1H) - naphtho[1,2-d]thiazolylidine-isopropylidene]-2,4-chromandione.

3. A photographic silver halide emulsion of claim 1 containing a supersensitizing combination in which the holopolar dye is 2 - dimethylamino - 5 - [di(1 - ethyl-2(1H) - naphtho[1,2 - d]thiazolylidine)isopropylidene]-4,6-(1H, 5H)-pyrimidinedione.

4. A photographic silver halide emulsion of claim 1 containing a supersensitizing combination in which the holopolar dye is 5-[di(1 - ethyl - 2(1H) - naphtho[1,2-d]thiazolylidene)isopropylidene]-2,2-dimethyl - 1,3 - dioxane-4,6-dione.

5. A photographic silver halide emulsion of claim 1 containing a supersensitizing combination in which the holopolar dye is 4 - [1,3 - di(1 - ethyl-2-naphtho[1,2-d]thiazolylidene)isopropylidene] - 1,2 - diphenyl - 3,5-pyrazolidinedione.

6. A photographic silver halide emulsion containing a supersensitizing combination of 3,3′ - dimethyl-9-phenyl - 4,5, - 4′, 5′ - dibenzothiacarbocyanine bromide with 3 - [di(1 - ethyl - 2 - (1H) - naphtho[1,2-d]thiazolylidine) - isopropylidene] - 2,4 - chromandione.

7. A photographic silver halide emulsion containing a supersensitizing combination of 3,3′ - diethyl-9-(2-thienyl)-4,5,4′,5′ - dibenzothiacarbocyanine p - toluenesulfonate with 2 - dimethylamino - 5 - [di - (1 - ethyl - 2(1H)-naphtho[1,2 - d]thiazolylidine)isopropylidene] - 4,6(1H, 5H)-pyrimidinedione.

8. A photographic silver halide emulsion containing a supersensitizing combination of 3,3′-dimethyl-9-phenyl-4,5,-4′,5′-dibenzothiacarbocyanine bromide with 5 - [di(1-ethyl - 2(1H) - naphtho[1,2 - d]thiazolylidine)isopropylidene] - 2,2 - dimethyl - 1,3 - dioxane - 4,6 - dione.

9. A photographic silver halide emulsion containing a supersensitizing combination of 3,3′-dimethyl-5,5′,9-triphenyltriacarbocyanine p - toluenesulfonate with 4 - [1,3-di(1 - ethyl - 2 - naphtho[1,2 - d]thiazolylidene)isopropylidene] - 1,2 - diphenyl - 3,5 - pyrazolidinedione.

10. A photographic silver halide emulsion containing a supersensitizing combination of 1,1′-diethyl-2,2′-cyanine iodide with 3-[di(1 - ethyl - 2(1H) - naphtho[1,2-d]thiazolylidene)-isopropylidene]-2,4-chromandione.

11. A photographic element comprising a support coated with at least one layer containing a photographic silver halide emulsion containing a supersensitizing combination of (1) a dye having the general formula:

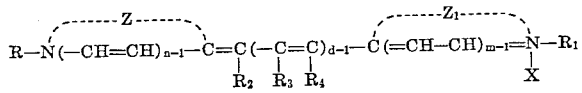

and (2) a holopolar dye having the general formula:

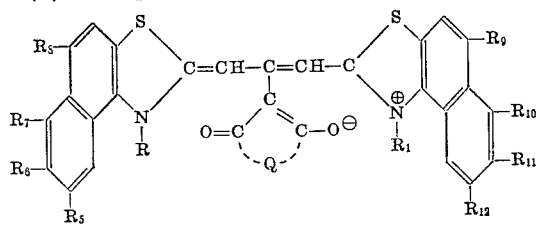

wherein $d$, $m$ and $n$ each represents a positive integer of from 1 to 2, each R and $R_1$ represents an alkyl group having from 1–12 carbon atoms, $R_3$ represents a member selected from the class consisting of the hydrogen atom, an alkyl group of from 1–4 carbon atoms, a phenyl group, a naphthyl group, a pyrryl group, an indolyl group, a thienyl group, a pyridyl group and an anilino group, $R_2$ and $R_4$ each represents the hydrogen atom, each of R and $R_2$ taken together and $R_1$ and $R_4$ taken together represent a divalent alkylene group having from 2 to 3 carbon atoms, $R_2$ and $R_4$ taken together represent an o-phenylene group, $R_5$, $R_6$, $R_7$, $R_8$, $R_9$, $R_{10}$, $R_{11}$ and $R_{12}$ each represents a member selected from the class consisting of hydrogen, a lower alkyl group, a lower alkoxy group, a halogen atom, the sulfo group, the carboxy group, a lower alkoxyloxy group, a benzoyloxy group, and an alkoxycarbonyl group having from 2 to 10 carbon atoms, X represents an acid anion, Q represents the non-metallic atoms required to complete a heterocyclic group selected from the class consisting of a 2,4-chromandione nucleus, a 4,6(1H,5H)-pyrimidinedione nucleus, a 1,3-dioxane-4,6-dione nucleus, and a 3,5-pyrazolidinedione nucleus and Z and $Z_1$ each repreesnts the non-metallic atoms required to complete a heterocyclic nucleus selected from the class consisting of a thiazole nucleus, a benzothiazole nucleus, a naphthothiazole nucleus, a thianaphtheno-7′,6′,4,5-thiazole nucleus, an oxazole nucleus, a benzoxazole nucleus, a naphthoxozole nucleus, a selenazole nucleus, a benzoselenazole nucleus, a naphthoselenazole nucleus, a thiazoline nucleus, a 2-quinoline nucleus, a 4-quinoline nucleus, a 1-isoquinoline nucleus, a 3-isoquinoline nucleus, an imidazole nucleus, a benzimidazole nucleus, a naphthimidazole nccleus, a 3,3-dialkylindolenine nucleus, and a pyridine nucleus.

12. A photographic element of claim 11 in which the holopolar dye is 3 - [di(1 - ethyl-2(1H)-naphtho[1,2-d]-thiazolylidene)-isopropylidene]-2,4-chromandione.

13. A photographic element of claim 11 in which the holopolar dye is 2-dimethylamino - 5 - [di(1-ethyl-2(1H)-naphtho[1,2-d]thiazolylidene)isopropylidene] - 4,5-(1H, 5H)-pyrimidinedione.

14 A photographic element of claim 11 in which the holopolar dye is 5 - [di(1 - ethyl - 2(1H)-naphtho[1,2-d]thiazolylidene)isopropylidene] - 2,2 - dimethyl - 1,3-dioxane - 4, 6 - dione.

15. A photographic element of claim 11 in which the holopolar dye is 4 - [1,3 - di(1-ethyl-2-naphtho[1,2-d] thiazolylidene)isopropylidene] - 1,2 - diphenyl - 3,5-pyrazolidinedione.

16. A photographic element comprising a support coated with at least one layer containing a photographic silver halide emulsion containing a supersensitizing combination of 3,3′-dimethyl-9-phenyl - 4,5,4′,5′ - dibenzothiacarbocyanine bromide with 3-[di(1-ethyl-2-(1H)-naphtho[1,2-d]thiazolylidine)-isopropylidene]-2,4-chromandione.

17. A photographic element comprising a support coated with at least one layer containing a photographic silver halide emulsion containing a supersensitizing combination of 3,3′ - diethyl-9-(2-thienyl)-4,5,4′,5′-dibenzothiacarbocyanine p-toluenesulfonate with 2-dimethylamino-5-[di(1 - ethyl - 2(1H) - naphthol[1,2-]thiazolylidine)isopropylidene]-4,5(1H,5H)-pyrimidinedione.

18. A photographic element comprising a support coated with at least one layer containing a photographic silver halide emulsion containing a supersensitizing combination of 3,3′ - dimethyl - 9-phenyl-4,5,4′,5′-dibenzothiacarbocyanine bromide with 5-[di(1-ethyl-2(1H)naphtho[1,2-d]thiazolylidine)isopropylidene] - 2,2 - dimethyl - 1,3-dioxane-4,6-dione.

19. A photographic element comprising a support coated with at least one layer containing a photographic silver halide emulsion containing a supersensitizing combination of 3,3′ - dimethyl-5,5′,9-triphenylthiacarbocyanine p-toluenesulfonate with 4 - [1,3 - di(1 - ethyl-2-naphtho[1,2-d] thiazolylidene)isopropylidene] - 1,2-diphenyl-3,5-pyrazolidinedione.

20. A photographic element comprising a support coated with at least one layer containing a photographic silver halide emulsion containing a supersensitizing combination of 1,1' - diethyl - 2,2'-cyanine iodide with 3-[di(1-ethyl-2 (1H) - naphtho[1,2-d]thiazolylidene)isopropylidene]-2,4-chromandione.

21. A photographic silver halide emulsion containing a supersensitizing combination of (1) a dye having the general formula:

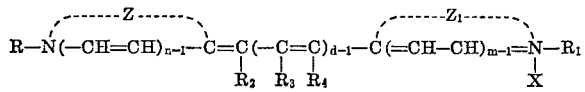

and (2) a holopolar dye having the general formula:

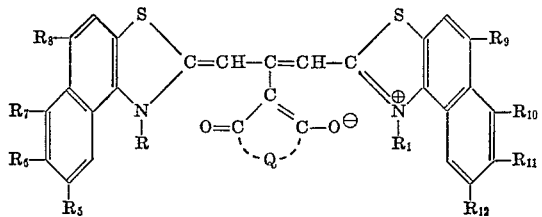

wherein $d$, $m$ and $n$ each represents a positive integer of from 1 to 2, each R and $R_1$ represents an alkyl group having from 1–12 carbon atoms, $R_3$ represents a member selected from the class consisting of the hydrogen atom, an alkyl group of from 1–4 carbon atoms, a phenyl group, a naphthyl group, a pyrryl group, an indolyl group, a thienyl group, a pyridyl group and an anilino group, $R_2$ and $R_4$ each represents the hydrogen atom, each of R and $R_2$ taken together and $R_1$ and $R_4$ taken together represent a divalent alkylene group having from 2 to 3 carbon atoms, $R_2$ and $R_4$ taken together represent an o-phenylene group, $R_5$, $R_6$, $R_7$, $R_8$, $R_9$, $R_{10}$, $R_{11}$ and $R_{12}$ each represents a member selected from the class consisting of hydrogen, a lower alkyl group, a lower alkoxy group, a halogen atom, the sulfo group, the carboxy group, a lower alkoyloxy group, a benzoyloxy group, and an alkoxycarbonyl group having from 2 to 10 carbon atoms, X represents an acid anion, Q represents the non-metallic atoms required to complete a heterocyclic group selected from the class consisting of a 2,4-chromandione nucleus, a 4,6 (1H,5H)-pyrimidinedione nucleus, a 1,3-dioxane-4,6-dione nucleus, and a 3,5-pyrazolidinedione nucleus, Z represents the non-metallic atoms required to complete a 5 to 6 membered heterocyclic nucleus, and $Z_1$ represents the non-metallic atoms required to complete a 5 to 6 membered heterocyclic nucleus.

22. A photographic element comprising a support coated with at least one layer containing a photographic silver halide emulsion containing a supersensitizing combination of (1) a dye having the general formula:

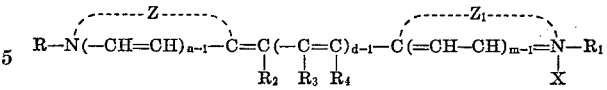

and (2) a holopolar dye having the general formula:

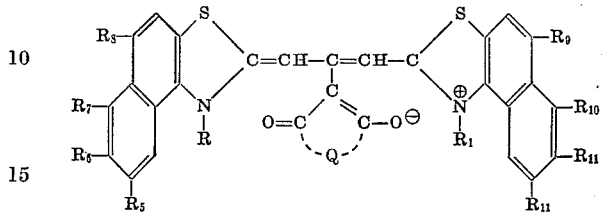

wherein $d$, $m$ and $n$ each represents a positive integer of from 1 to 2, each R and $R_1$ represents an alkyl group having from 1–12 carbon atoms, $R_3$ represents a member selected from the class consisting of the hydrogen atom, an alkyl group of from 1–4 carbon atoms, a phenyl group, a naphthyl group, a pyrryl group, an indolyl group, a thienyl group, a pyridyl group and an anilino group, $R_2$ and $R_4$ each represents the hydrogen atom, each of R and $R_2$ taken together and $R_1$ and $R_4$ taken together represent a divalent alkylene group having from 2 to 3 carbon atoms, $R_2$ and $R_4$ taken together represent an o-phenylene group, $R_5$, $R_6$, $R_7$, $R_8$, $R_9$, $R_{10}$, $R_{11}$ and $R_{12}$ each represents a member selected from the class consisting of hydrogen, a lower alkyl group, a lower alkoxy group, a halogen atom, the sulfo group, the carboxy group, a lower alkoyloxy group, a benzoyloxy group, and an alkoxycarbonyl group having from 2 to 10 carbon atoms, X represents an acid anion, Q represents the non-metallic atoms required to complete a heterocyclic group selected from the class consisting of a 2,4-chromandione nucleus, a 4,6 (1H,5H)-pyrimidinedione nucleus, a 1,3 - dioxane - 4,6-dione nucleus, and a 3,5-pyrazolidinedione nucleus, Z represents the non-metallic atoms required to complete a 5 to 6 membered heterocyclic nucleus, and $Z_1$ represents the non-metallic atoms required to complete a 5 to 6 membered heterocyclic nucleus.

References Cited
UNITED STATES PATENTS

| 2,704,714 | 3/1955 | Carroll et al. | 96—104 |
| 2,704,715 | 3/1955 | Carroll et al. | 96—104 |
| 2,704,720 | 3/1955 | Jones | 96—104 |
| 3,140,182 | 7/1964 | Haseltine et al. | 96—106 |
| 3,140,951 | 7/1964 | Haseltine et al. | 96—101 |

OTHER REFERENCES

Zenno, Chemical Abstracts, vol. 48, pp. 11063–4 (1954).

J. TRAVIS BROWN, *Primary Examiner.*